United States Patent Office 2,842,537
Patented July 8, 1958

2,842,537
PYRAZOLONE DYESTUFFS

Albert F. Strobel, Phillipsburg, N. J., and William W. Williams, Easton, Pa., assignors to General Aniline & Film Corporation, New York, N. Y., a corporation of Delaware No Drawing. Application December 30, 1953
Serial No. 401,392

3 Claims. (Cl. 260—163)

This invention relates to the production of novel azo dyestuffs and more particularly to azo dyestuffs derived from a pyrazolone coupling component.

The use of coupling components containing a pyrazolone nucleus in the production of azo dyestuffs has long been known. Thus, U. S. Patent No. 901,675 discloses the production of yellow azo dyestuffs by coupling 1-ortho-meta - dichlor - para - sulfophenyl - 5 - pyrazolone - 3 - carboxylic acid or 1-ortho-meta-dichlor-para-sulfophenyl-3-methyl-5-pyrazolone with the diazo compounds of aniline carboxylic acids, aniline sulfonic acids, their homologs and halogen derivatives. However, while these dyestuffs possess good light fastness, their fastness to washing has never been completely satisfactory.

It is an object of this invention to provide azo dyestuffs derived from a coupling component containing a pyrazolone nucleus which dyes wool in improved color yields of good fastness to light and exceptionally good fastness to washing. Other objects and advantages will appear as the description proceeds.

The attainment of the above objects is made possible by the provision of dyestuffs having the formula:

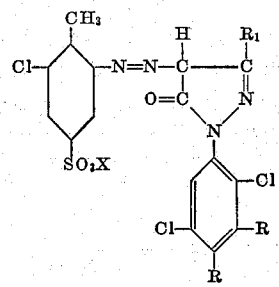

wherein X is selected from the group consisting of hydrogen, alkali metal, ammonium, N-lower alkyl ammonium and N-lower hydroxyalkyl ammonium, $R_1$ is selected from the group consisting of lower alkyl and COOM, M is selected from the group consisting of lower alkyl and X, one R is hydrogen and the other R is $SO_3X$. It has been found that dyestuffs having the above formula constitute wool dyes of good light fastness and exceptional fastness to washing and fulling.

The dyestuffs of this invention may be prepared by diazotizing a compound of the formula:

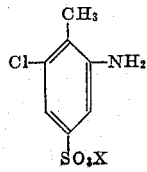

and coupling the resulting diazo compound with a compound of the formula:

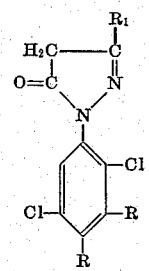

wherein X, $R_1$, M and R have the values given above.

The aforementioned diazo compound may be prepared from the compound 6-chloro-2-nitrotoluene, which is at present a by-product having no useful application, by sulfonation, reduction and diazotization in known manner.

It will be readily understood that the diazotization and coupling reactions involved in the production of the dyestuffs of the instant invention may be conducted in the usual manner well known in the art, the improved and unexpected results obtained thereby being attributable to the specific combination of the defined diazo component and coupling component. In the above formulae, X is preferably sodium although it may be hydrogen, potassium, ammonia, methylamine, diethylamine, propyl amine, isopropanol amine, or the like. $R_1$ may be COOM, methyl, ethyl or the like. M is preferably sodium, although it may instead be methyl, ethyl, or any of the other values given above for X. In the preferred embodiment, the R group in the para position of the phenyl pyrazolone is $SO_3Na$, the other R being hydrogen (unsubstituted).

The following examples, in which parts are by weight unless otherwise indicated, are illustrative of this invention and are not to be regarded as limitative.

Example 1

Preparation and evaluation of the dyestuff:

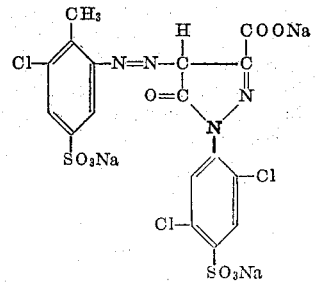

31.8 gms. (0.144 moles) of 2-amino-6-chloro-toluene-4-sulfonic acid (4-methyl-5-chlorometanilic acid) were dissolved in 200 mls. water and 16.4 mls. 40% sodium hydroxide (wt./vol.). To the solution was added 101 mls. of sodium nitrite solution (10% wt./vol.). The material was cooled to 10° C. This solution was then added dropwise to a well-stirred mixture of 200 mls. water, 30 mls. concentrated hydrochloric acid, and 100 gms. ice. The material was stirred 20 minutes, and the excess nitrite was destroyed by adding 4.5 mls. of 10% sulfamic acid (wt./vol.).

Meanwhile a coupler solution was prepared by dissolving 50.8 gms. (0.144 moles) of 1-(2,5-dichlor-4-sulfophenyl)-3-carboxyl-5-pyrazolone in 120 mls. water and 150 mls. of 20% sodium carbonate solution (wt./vol.). The coupling solution was added to the diazo solution, pH=5.0. All the material dissolved. A negative test for diazo (spot with resorcinol) was obtained immediately. The material was stirred overnight. The yellow dye partially crystallized out. Final volume=1200 mls. 120 gms. of salt were added, stirred 2 hours, filtered. The presscake was washed with 40 mls. of 5% salt solution (wt./vol.), followed by 100 mls. of 10% salt solution (wt./vol.). There was obtained 89.6 gms. of material which dyed from an acid bath 55/100 on wool vs. Fast Light Yellow 2G (C. I. 639) with equal light fastness to type, brighter shade, and much better wash fastness (AATCC No. 2 wash test).

The above dyeing operation is performed by immersing 10.0 gms. of wool cloth in 300 mls. of water containing 0.3 gms. formic acid and 0.10 gms. of Fast Light Yellow 2G at 160° F. The cloth is worked in the dyebath for 1 hour at this temperature, after which it is removed, rinsed, and dried. Simultaneously a similar dyeing is carried out in a second beaker using again 10.0 gms. of wool cloth, but in this case 0.055 gms. of the new dye as prepared above.

*Example 2*

Preparation and evaluation of the dyestuff:

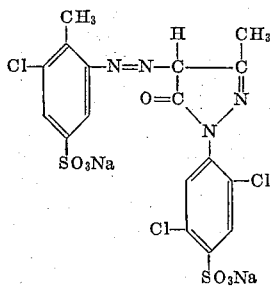

The procedure of Example 1 was repeated except that the coupler was substituted by an equimolar proportion of 1 - (2,5 - dichlor - 4 - sulfo - phenyl) - 3 - methyl - 5 - pyrazolone.

The dye obtained dyed 100/100 vs. Fast Light Yellow 2G, and showed 30% less color yield than the dye of Example 1. The dye of Example 2 when applied to wool in the manner described in Example 1, was definitely superior to Fast Light Yellow 2G but slightly inferior to the dye of Example 1 in AATCC Wash Test No. 2.

While this invention has been disclosed with respect to certain preferred embodiments thereof, various modifications and variations within the spirit and scope of the invention will be obvious to those skilled in the art. It is accordingly to be understood that such modifications and variations are included within the purview of this application and the scope of the appended claims.

We claim:
1. Compounds of the formula

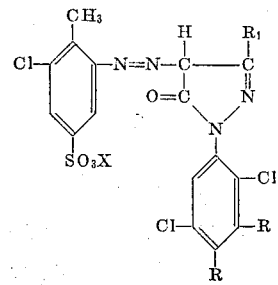

wherein X is selected from the group consisting of hydrogen, sodium and potassium, $R_1$ is a radical selected from the group consisting of —$CH_3$, —$C_2H_5$, —COOH, —COONa, —COOK, —COOCH$_3$ and —COOC$_2$H$_5$, one R is hydrogen and the other is $SO_3X$.

2. A compound of the formula

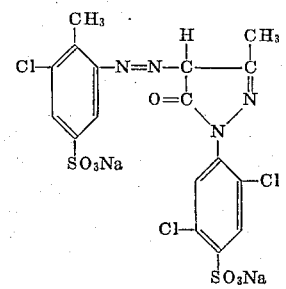

3. A compound of the formula

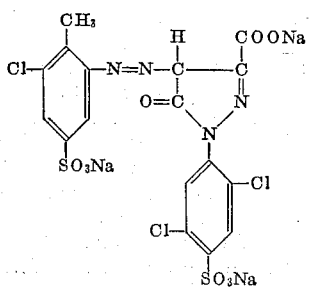

References Cited in the file of this patent
UNITED STATES PATENTS

| | | |
|---|---|---|
| 901,675 | Boniger | Oct. 20, 1908 |
| 935,370 | Julius et al. | Sept. 28, 1909 |
| 1,098,600 | Volkmann | June 2, 1914 |
| 1,539,347 | Boeniger | May 26, 1925 |

FOREIGN PATENTS

| | | |
|---|---|---|
| 434,402 | Germany | Sept. 28, 1926 |